United States Patent [19]

Vrba

[11] 4,201,885
[45] May 6, 1980

[54] ROUTINABLE CLOCK CIRCUIT

[75] Inventor: James J. Vrba, Berwyn, Ill.

[73] Assignee: GTE Automatic Electric Laboratories Incorporated, Northlake, Ill.

[21] Appl. No.: 955,280

[22] Filed: Oct. 26, 1978

[51] Int. Cl.² .................. H04L 7/00; G06F 15/16
[52] U.S. Cl. ..................... 375/106; 179/175.2 C
[58] Field of Search .................. 178/69.1, 68; 179/15 BA, 15 BS, 175.2 C; 235/304; 325/325

[56] References Cited

U.S. PATENT DOCUMENTS

| | | | |
|---|---|---|---|
| 4,021,784 | 5/1977 | Kimlinger | 178/69.1 |
| 4,027,261 | 5/1977 | Laurent et al. | 178/69.1 |

*Primary Examiner*—Thomas A. Robinson

*Attorney, Agent, or Firm*—Robert J. Black; Frank J. Bogacz

[57] ABSTRACT

A routinable clock circuit for use in an automatic identification of outward dialing (AIOD) system. The clock circuit consists of asynchronous receive and transmit portions connected and utilized in such a manner as to permit a central processing unit to routine both portions in conjunction with one another to determine whether a fault condition exists. Should such a fault condition exist, the circuitry can be used to determine in which portion the fault lies and to further localize the fault to a functional area within the particular portion of the clock circuit. The clock circuit normally functions to drive logic circuitry for transmitting and receiving data consisting of information associated with calls initiated at a remotely located PABX.

6 Claims, 3 Drawing Figures

ROUTINABLE CLOCK CIRCUIT

BACKGROUND OF THE INVENTION (1) Field of the Invention

The present invention relates to automatic identification of a PABX call to a switching center and more particularly to circuit apparatus and interconnections for routing and localizing faults in asynchronous clock circuits which control transmission and reception of data sent from a PABX to a telephone central office via a data link.

(2) Description of the Prior Art

Telephone switching centers are connected to PABX's, located on subscriber premises, via trunk circuits. Many individual stations are connected to the PABX. A relatively smaller number of trunk circuits connect the PABX to the switching center. Therefore, each PABX station must dial an access code digit to seize control of an available trunk circuit.

As a result of this oeration, the switching center is unable to distinguish the identity of the particular station originating the telephone call. Historically, operators were utilized to ask the particular station user for his station identity before connecting the call. Such information was manually recorded by the operator.

With the advent of electronics, sophisticated systems for the transmission of this station information from the PABX to the central office were developed. This equipment consisted of electronics located on the PABX subscribers premises, data link equipment connecting the subscriber premises to the switching center, and additional electronics added to the switching center. These systems are termed automatic identification of outward dialing systems. Such systems provide the switching center with the identity of the calling station automatically and without the need of operator intervention.

When a PABX station user dials the access code for a trunk circuit connecting him to the switching center (central office trunk), the station identity is noted at the PABX. Also noted is the identity of the trunk circuit selected, connecting the station through the PABX to the switching center. Typically, these two pieces of information are combined into a 41-bit transmission. The station identity consists of 20-bits, the trunk identity 20-bits and a 1-bit synchronization mark. The above information is transmitted via a separate data link facility to the switching center where it is placed in a temporary storage buffer.

As the central office trunk is seized at the PABX, it causes a "Call-For-Service" to be generated at the switching center. When the "Call-For-Service" is recognized, the switching center identifies the requestor by the trunk identity stored in the center's data base. At convenient points in servicing the call, the temporary storage buffer is searched using the trunk identity obtained when the "Call-For-Service" was recognized. Upon finding a trunk identity concurrence, the station identity is placed into the switching centers memory corresponding to the call. Using the above identified trunk, a billing record is generated including the particular station identity.

The collected information is stored on a suitable output device and interrupted by an electronic data processing center. The processing center is able to generate a detailed billing document containing the charges and the number of calls made by each station within the PABX. These detailed billings aid the corporate customer in accounting for its telephone charges.

Clock circuits form an integral part of such data reception systems and are well known. These circuits provide the useful function of driving gating and logic circuits in the transmission and reception of data. Since other logic circuits depend for their operation on the operation of such clock circuits, the functional operability and dependability of clock circuits is of paramount importance to the required continuous operation of a communication system.

Clock circuits are of particular importance in situations wherein revenues are charged telephone subscribers depending upon the integrity of the information which is processed by logic circuits controlled by the clock circuit. The present block circuit is one which is a portion of a revenue producing system. This system is concerned with the automatic identification of outward dialing (AIOD) of a PABX station. Information concerning the particular station dialing an outgoing call from the PABX is transmitted by this system to produce billing information for each station associated with the PABX.

Therefore, such clock circuits must be highly reliable and maintainable. One solution to this problem is presented in U.S. Pat. No. 3,803,568 issued on Apr. 9, 1974, To C. S. Higashide. This patent teaches the use of two identical clock circuits wired for redundant operation. One clock circuit functions as the main system clock and the other functions as a standby system clock. If a fault is detected, the main system clock pulses are inhibited and the standby system clock pulses are enabled. The clock circuit described therein is of necessity one including synchronous operation of the two clock circuits. Furthermore, these two clock circuits are dedicated to the same functional operation. Such an arrangement is both complex and costly.

Accordingly, it is an object of the present invention to provide a simplified routinable clock circuit utilizing two independent asynchronous system clocks which provide the timing required for the processing of two independent functions. Furthermore, it is an additional object of the present invention to provide a highly reliable clock circuit without need of duplication.

SUMMARY OF THE INVENTION

The present invention consists of a routinable clock circuit for use in the transmission of station and trunk identity data between a private automatic branch exchange (PABX) and a telephone switching center.

The clock circuit described herein provides the driving function in the reception and transmission for routining purposes, of the above mentioned data.

The routinable clock circuit consists of two independent asynchronously operated clock portions of nominally the same frequency. The two independent clock circuits are coupled so as to provide the ability to routine one clock circuit using the other and vice versa. Both routinable clock circuits (transmitting and receiving) share a common routing latch connected between the central processor of the switching center and the oscillator output disabling logic of each clock circuit. Oscillator latches are connected between central processing unit and gating logic which control operation of each oscillator's logic. The gating logic is connected directly to the oscillator portion of each clock circuit. Also, the routining latch has direct connections to the logic of both oscillators. Output signals of each oscillator circuit are coupled to the inputs of a related counter circuit. The oscillator circuit of the opposite portion of the clock circuit is also connected to the first oscillator's counter circuit. That is, each oscillator circuit has output connections to its corresponding counter circuit and also to the counter circuit of the opposite portion of the clock circuit. An output latch is conncted between each counter circuit and the central processing unit.

The central processing unit sets the routining latch thereby disabling the crystal oscillator source of each oscillator circuit. Next, the central processing unit pulses the oscillator latch corresponding to a particular oscillator by first setting the oscillator latch and then resetting the oscillator latch. This pulse produces an output pulse of the oscillator circuit which is coupled to the counter circuit. The central processing unit examines the output latch while pulsing the oscillator latch to determine whether the counter and output latch circuits are properly operating. A similar operation is performed by the central processing unit on the other oscillator circuit contained in the clock circuit. The two clock circuits are operating at the same frequency, but not synchronously. Therefore, the counter circuit associated with each oscillator circuit begins to cycle through a count driven by the opposite oscillator's output. However, the oscillator output of each oscillator circuit is coupled to its counter circuit so that it resets the counter circuit back to its initial state. If both clock circuits are working the counter circuit will count from 0 to 1 and then be reset back to 0.

If an oscillator fails to operate the opposite oscillator will drive the failed oscillator's corresponding counter circuit up in value reaching a predetermined threshold limit. This limit is currently set at a value of 4 counts. When this count is reached, the fail latch corresponding to the oscillator in which there was a fault will be set. The central processor then examines the status of each of the fail latches to determine the portion of the clock circuit wherein the fault is detected.

DESCRIPTION OF THE PREFERRED EMBODIMENT

Figure 1:
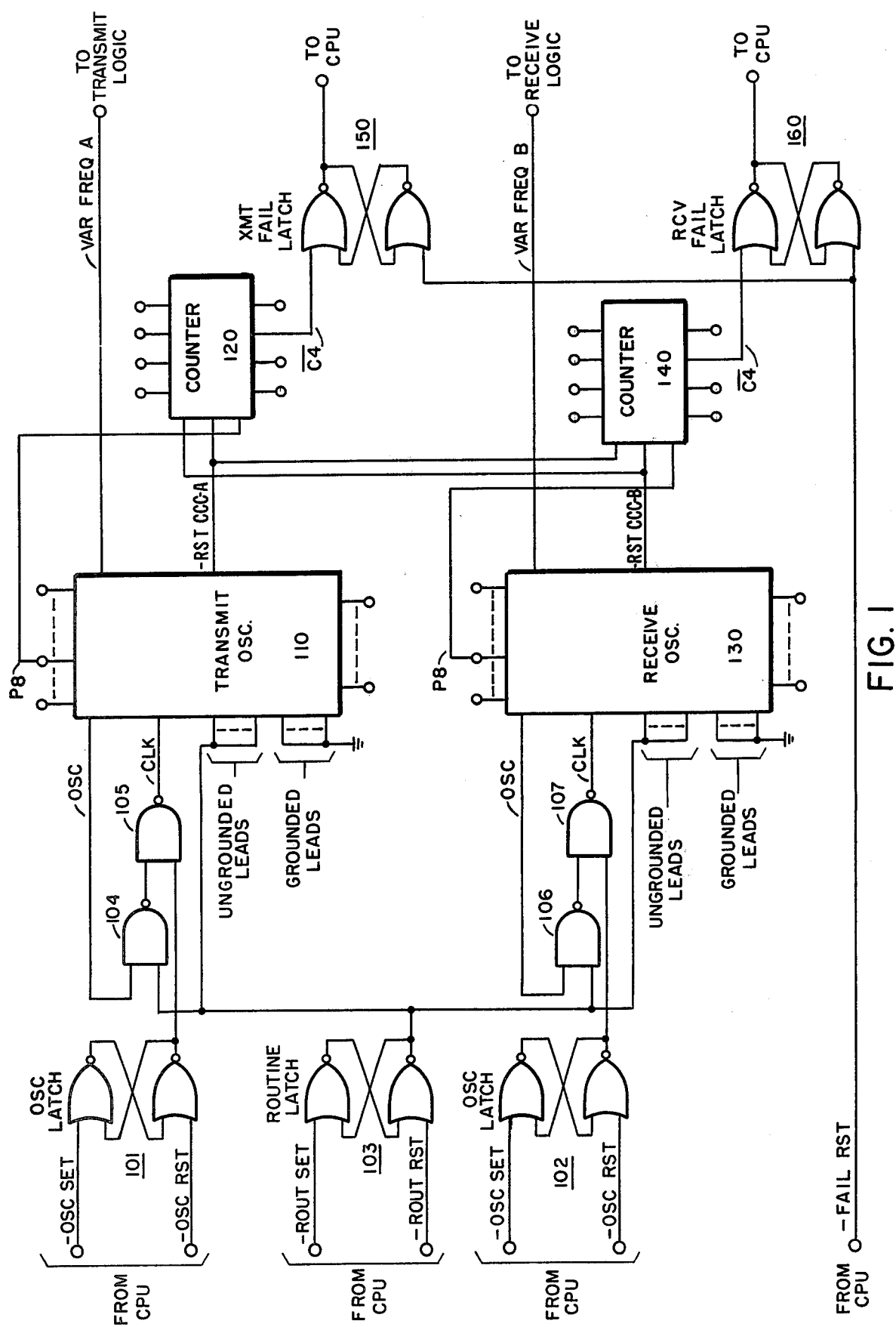
FIG. 1 is a schematic diagram depicting the routinable clock circuit embodied in the present invention.

Referring to FIG. 1, a routinable clock circuit is shown connected between a central processing unit (CPU) of an associated switching center and the transmit-receive logic of an associated data link. The transmit portion of the clock circuit consists of oscillator latch 101, NAND gates 104 and 105, digital variable frequency oscillator 110 and counter 120. Similarly, the receive portion of the clock circuit consists of oscillator latch 102, NAND gates 106 and 107, digital variable frequency oscillator 130 and counter 140. Transmit fail latch 150 and receive fail latch 160 connected between the clock circuit and the CPU, constitute the means by which the CPU detects and isolates faults in the clock circuit. Routine latch 103, connected between the CPU and the clock circuit, inhibits the normal operation of the transmit and receive portions of the clock circuit and establishes suitable diagnostic conditions for routining the clock circuit. The two clocks operate at the same frequency, but not synchronously.

Routine latch 103 is connected between the switching center's CPU and NAND gate 104 of the transmit portion of the clock circuit and NAND gate 106 of the receive portion of the clock circuit. In addition, routine latch 103 also is connected to each ungrounded lead of each oscillator 110 and 130. Oscillator latch 101 is conncted between the CPU and NAND gate 105 of the transmit portion of the clock circuit. Similarly, oscillator latch 102 is connected between the CPU and NAND gate 107 of the receive portion of the clock circuit. NAND gate 104 is connected to NAND gate 105 which in turn is connected to oscillator 110 and NAND gate 106 is conncted to NAND gate 107 which in turn is connected to oscillator 130.

Oscillator 110 is connected to counter 120 and to counter 140. Similarly, oscillator 130 is connected to counter 140 and to counter 120.

Transmit fail latch 150 is connected between counter 120 and the CPU. Receive fail latch 160 is connected between counter 140 and the CPU.

To routine the present clock circuit, the CPU sets the routine latch 103 which inhibits NAND gates 104 and 106 from transmitting their respective oscillator OSC signals to their respective oscillator logic circuits 110 and 130. In addition, setting of routine latch 103 provides a ground connection to all ungrounded leads of each oscillator circuit 110 and 130.

Next, the CPU applies pulses to the clock lead CLK of the oscillator 110 by manipulating the OSC SET and OSC RST leads of oscillator latch 101. This causes a corresponding pulse to appear on the RST CCC-A lead of oscillator 110. This pulse is applied to the counter 120. Therefore, each pulse transmitted by the CPU will reset counter circuit counter 120. Simultaneously, the CPU manipulates oscillator latch 102 in a comparable fashion to that described above for latch 101. Thereby, a pulse is produced on lead RST CCC-B. This pulse is transmitted to counter 140 and the counter is reset. In addition, the RSTCCC-B pulse is transmitted to counter 120 to increment the counter circuit by one; and RST CCC-A pulse is likewise transmitted to counter 140. Therefore, each counter 120 and 140 is incremented by the opposite RST CCC signal and reset by its respective RST CCC signal. If both circuits are in a proper functional state, each counter 120 and 140 will count from 0 to 1 and then will be reset.

If receive oscillator 130 fails to operate properly, then transmit oscillator 110 will increment counter 140 to count up to a predetermined threshold value of 4. At this value, a signal will be produced on the $\overline{C4}$ lead of counter 140. The $\overline{C4}$ signal sets receive fail latch 160, thereby indicating to the CPU the fault in oscillator 130. If oscillator 110 had failed, transmit fail latch 50 is set indicating this condition to the CPU as described above for oscillator 130.

Further, if routine latch 103 or gates 104, 105, 106 or 107 fail, the respective counter will count to its threshold and set the respective fail latch thereby indicating this failure to the CPU.

In order to localize the detection of a fault between an oscillator and its corresponding counter unit, the CPU: sets the routine latch 103 thereby stopping both clock circuits and placing them in a suitable diagnostic state for routining; next, the CPU manipulates oscillator latch 101 then 102 to provide one pulse each to oscillator 110 and 130. Assuming that oscillator 110 is functional the pulse is transmitted via the RST CCC-A lead resetting counter 120. Similarly, if oscillator 130 is functional its pulse will reset counter 140; next, the CPU will reset both fail latches 150 and 160 by pulsing the FAIL RST lead.

Oscillator latch 101 is manipulated by the CPU to provide three pulses to oscillator 110. Assuming that oscillator 110 is functional the pulses are transmitted via the RST CCC-A lead to counter 140. Counter 140 will increment three times, once for each pulse. At this time the status of the receive fail latch 160 is checked to insure that the latch has not been set. Subsequently, a fourth pulse is transmitted via oscillator latch 101 to counter 140. This fourth pulse should cause counter 140 to reach its threshold of four, thereby setting the receive fail latch 160 via the $\overline{C4}$ lead. Again, the receive fail latch 160 is interrogated by the CPU to determine that it in fact is set. If both of the above mentioned tests have been conducted successfully, the detected fault is not contained in the counter 140 and is located in the receive oscillator 130. If both tests fail the fault is in counter circuit 140.

Localization of the transmit clock circuit is conducted as described above for the receive clock circuit, except that oscillator latch 102 is manipulated by the CPU to cause receive oscillator 130 and counter 120 to operate as described above for the receive clock circuit.

The routinable clock circuit described herein is operable only for a single fault condition. That is, simultaneous faults in each portion of the clock circuit the transmitter and receiver, will not be detectable using the above scheme or circuitry.

Figure 2:
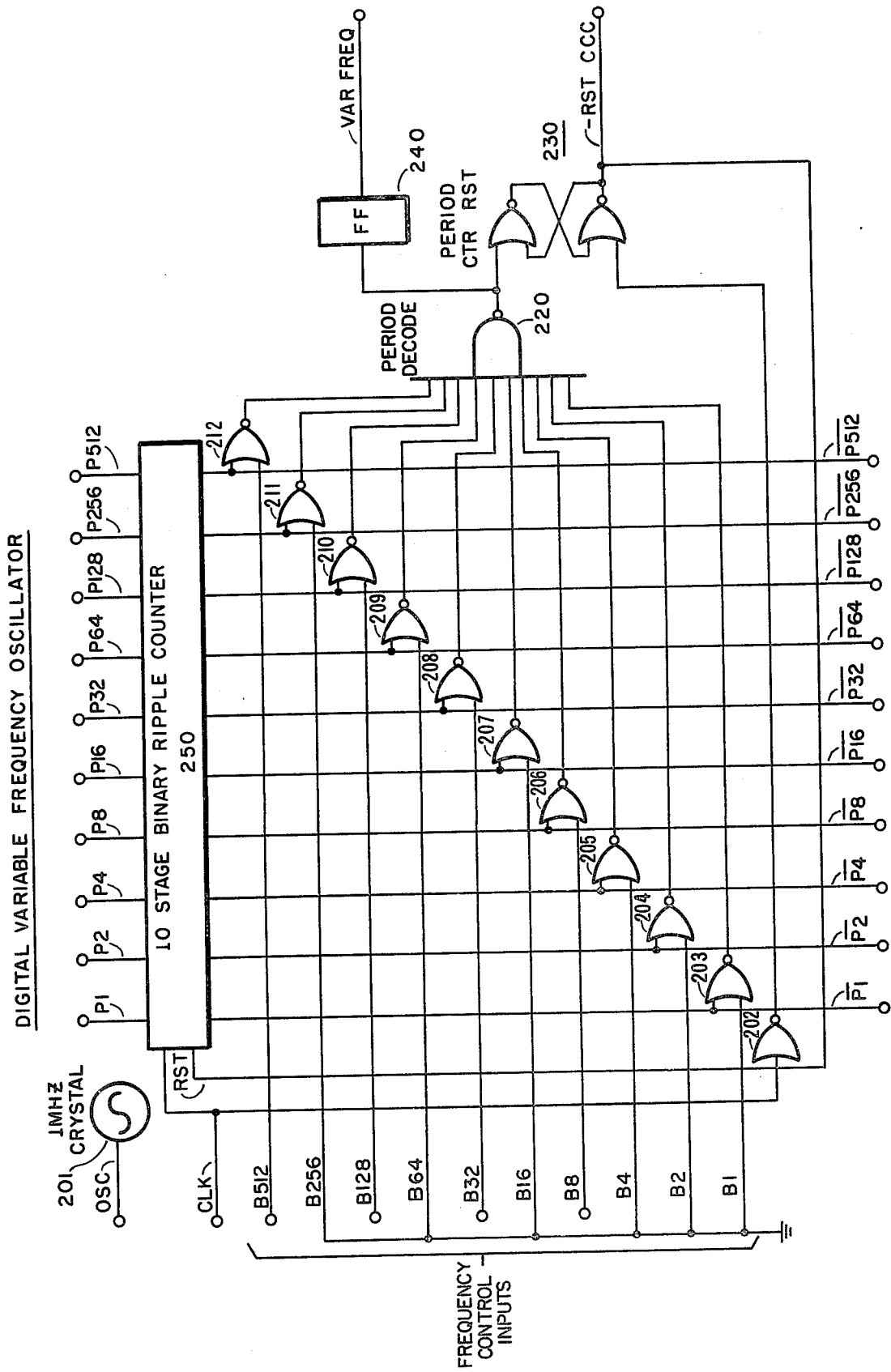
FIG. 2 is a detailed schematic diagram of a digital variable frequency oscillator in the clock circuit of FIG. 1.

FIG. 2 depicts the details of a digital variable frequency oscillator (DVFO). The pulse source 201 is a 1 MHZ crystal oscillator provided via an output lead OSC which is connected through the gating circuit shown in FIG. 1 to the CLK lead of the oscillator circuit. Frequency control inputs B1 through B512 control the frequency of the signal output on lead VAR FREQ. Unused frequency control inputs are grounded; therefore, the frequency at which the clock circuit operates is determined by summing the values of the ungrounded frequency control inputs. In the present case, it is determined by summing the numbers of the open frequency control input leads B8=8, B32=32, B128=128 and B512=512. These ungrounded leads control NOR gates 206, 208, 210 and 212 respectively. These NOR gates provide signals to period decode NAND gate 220. For each period decode by gate 220, flip-flop 240 is toggled thereby providing a square wave output. In addition, reset circuit 230 is set providing a pulse on the RST CCC lead and resetting the 10 stage binary ripple counter 250.

For operation during routing, each frequency control input which is open circuited has ground applied to it by the routing latch as described above. Each count of the ripple counter 250 has both positive and negative signals corresponding to the output count (p1 through P512 positive and −P1 through −P512 negative).

Figure 3:
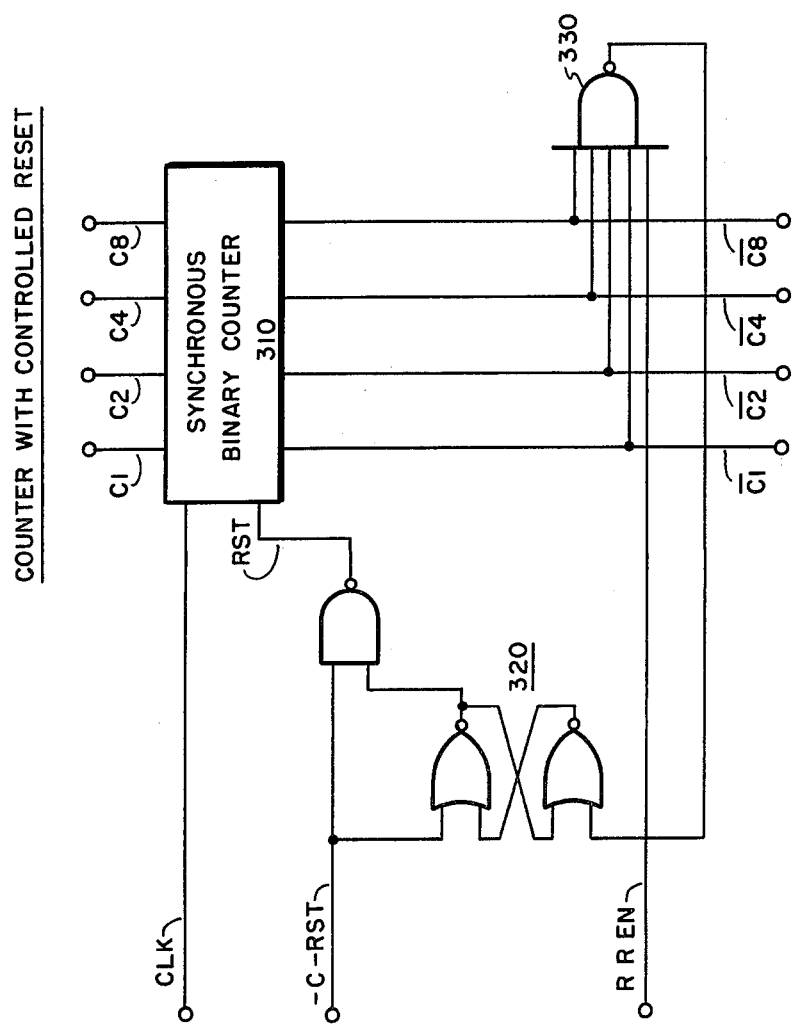
FIG. 3 is a detailed schematic diagram of a counter with controlled reset, in the clock circuit of FIG. 1.

FIG. 3 shows the details of a counter with control reset as shown in FIG. 1. For each pulse that is applied to the CLK lead the synchronous binary counter 310 increments once and provides a binary indication of its value on leads C1 through C8 for positive indication and −C1 through −C4 for negative indication. For each decode by NAND gate 330, reset latch 320 is reset.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A routinable clock circuit for use in an automatic number identification system connecting a private automatic branch exchange to a switching center including a central processing unit, said routinable clock circuit including a transmit portion and a receive portion, each of said portions of said routinable clock circuit comprising:
    gating means connected to said central processing unit of said switching center;
    oscillator means connected to said gating means and operated in response to said gating means to produce periodic pulses of a predetermined frequency;
    counting means, said counting means of said transmit portion connected to said oscillator means of said transmit portion and to said oscillator means of said receive portion and said counting means of said receive portion connected to said oscillator means of said receive portion and to said oscillator means of said transmit portion, said counting means of said transmit portion operated in response to a predetermined number of said periodic pulses received from said oscillator means of said transmit portion, to produce an output pulse and said counting means of said receive portion operated in response to a predetermined number of said periodic pulses received from said oscillator means of said receive portion, to produce an output pulse;
    output latching means conncted between said counter means and said central processing unit, said output latching means of said receive portion operated in response to said output pulse produced by said counter means of said receive portion to generate a continuous output signal corresponding to said receive portion output pulse, whereby said output signal is detected by said central processing unit to indicate a fault condition present in said receive portion of said routinable clock circuit, and said output latching means of said transmit portion operated in response to said output pulse produced by said counter means of said transmit portion to generate a continuous output signal corresponding to said transmit portion output pulse, whereby said output signal is detected by said central processing unit to indicate a fault condition present in said transmit portion of said routinable clock circuit.

2. A routinable clock circuit as claimed in claim 1, wherein: there is further included input latching means connected to said gating means and to said oscillator means of each of said portions of said routinable clock circuit and conncted to said central processing unit, said input latching means operated in response to said central processing unit, to enable each of said portions of said clock circuit for operation in a routining mode of operation and inhibiting normal operation of said oscillator means.

3. A routinable clock circuit as claimed in claim 2, wherein: said gating means further includes a latch circuit connected to said central processing unit, a first NAND gate connected to said input latching means and a second NAND gate connected to said first NAND gate, to said latch circuit and to said oscillator means.

4. A routinable clock circuit as claimed in claim 3, wherein: said oscillator means includes a crystal oscillator operated to generate periodic pulses of a predetermined frequency, connected to said first NAND gate of said gating means, a counter connected to said second AND gate of said gating means, period decode circuit means connected to said counter, a flip-flop connected to said period decode circuit means and a reset circuit connected between said period decode circuit means and said counter.

5. A routinable clock circuit as claimed in claim 1, wherein: said gating means is operated in response to an input pulse received from said central processing unit to operate said oscillator means produce an output pulse in response to said input pulse.

6. A routinable clock circuit as claimed in claim 1, wherein: said counting means includes an input gating circuit, a counter connected to said input gating circuit and a reset circuit connected between said counter and said input gating circuit.

* * * * *